United States Patent [19]

Jackson, Jr. et al.

[11] 4,287,325

[45] Sep. 1, 1981

[54] COPOLYESTERS DERIVED FROM AROMATIC POLYESTERS AND GLYCOL POLYESTERS

[75] Inventors: Winston J. Jackson, Jr.; Herbert F. Kuhfuss, both of Kingsport, Tenn.

[73] Assignee: Eastman Kodak Company, Rochester, N.Y.

[21] Appl. No.: 106,962

[22] Filed: Dec. 26, 1979

[51] Int. Cl.³ ............................................. C08L 67/02
[52] U.S. Cl. .................................................. 525/444
[58] Field of Search ......................................... 525/444

[56] References Cited

U.S. PATENT DOCUMENTS

| | | | |
|---|---|---|---|
| 3,651,172 | 3/1972 | Barkey et al. | 525/444 |
| 3,946,091 | 3/1976 | Sakata et al. | 525/444 |
| 4,031,165 | 6/1977 | Saiki et al. | 525/444 |

Primary Examiner—Maurice J. Welsh
Attorney, Agent, or Firm—William P. Heath, Jr.; Daniel B. Reece, III

[57] ABSTRACT

Thermoplastic copolyester compositions prepared from combination of a bisphenol A polyester and a copolyester of poly(ethylene terephthalate) modified with 1,4-cyclohexanedimethanol. The compositions are characterized by excellent melt processability, high impact strength, and flexural modulus that is higher than that of either of the polymers used in the preparation of the thermoplastic copolyester compositions.

3 Claims, No Drawings

COPOLYESTERS DERIVED FROM AROMATIC POLYESTERS AND GLYCOL POLYESTERS

DESCRIPTION

TECHNICAL FIELD

This invention relates to new high molecular weight plastic compositions. It is particularly concerned with compositions of aromatic polyesters of bisphenol A (4,4'-isopropylidenediphenol) and copolyesters of poly(ethylene terephthalate) modified with 20-50 mole percent 1,4-cyclohexanedimethanol.

The plastic compositions possess a combination of properties comprising excellent melt processability and exceptionally high mechanical properties. The compositions also have improved solvent resistance. The compositions are valuable for the manufacture of plastics, fibers, films and other shaped objects.

BACKGROUND ART

Blends of poly(ethylene terephthalate) and bisphenol A polyesters are disclosed in U.S. Pat. No. 3,946,091. These blends are polyesters of terephthalic acid and one or more aliphatic diols and another component which is a copolyester of 2,2-bis(4-hydroxyphenyl)propane and terephthalic acid and isophthalic acid. Also disclosed are copolyesters of a bishydroxyphenyl compound and terephthalic acid and isophthalic acid.

Japanese Kokai No. 78 51,246 discloses blends of poly(ethylene terephthalate) with a polyester of bisphenol A, terephthalic acid and isophthalic acid.

DISCLOSURE OF INVENTION

This invention is a class of novel copolyesters prepared from about 50 to 80 weight percent of an aromatic polyester derived from about 20 to 80 mole percent terephthalic acid, 80-20 mole percent isophthalic acid, and 4,4'-isopropylidenediphenol and about 50-20 weight percent of a glycol polyester derived from terephthalic acid, about 50-80 mole percent ethylene glycol and about 50-20 mole percent 1,4-cyclohexanedimethanol. It is preferred that the glycol polyester be present in the amount of about 30-40 weight percent.

We have discovered that when a polyester derived from terephthalic acid, isophthalic acid and bisphenol A is melt extruded with a copolyester derived from terephthalic acid, 50-80 mole percent ethylene glycol and 50-20 mole percent 1,4-cyclohexanedimethanol, the processing temperature of the bisphenol polyester is reduced about 100° C., the flexural modulus of the resultant composition is higher than that of either of the polymers used in the preparation of the composition and the notched Izod impact strength remains high.

This invention, therefore, is a class of thermoplastic compositions, melt processable at about 250°-300° C., which is made up of a combination of polyesters comprising (1) 50-80 weight percent of an aromatic polyester derived from 20-80 mole percent terephthalic acid, 80-20 mole percent isophthalic acid and bisphenol A; and (2) 50-20 weight percent of a glycol polyester derived from 50-80 mole percent ethylene glycol, 50-20 mole percent 1,4-cyclohexanedimethanol and terephthalic acid.

The glycol polyesters used in this invention to prepare the plastic compositions may be prepared by conventional procedures from ethylene glycol, 1,4-cyclohexanedimethanol and dimethyl esters of the dicarboxylic acids. Part of the terephthalic acid used in preparing these copolyesters may be replaced with other aromatic acids such as isophthalic acid, but terephthalic acid is preferred. The glycol portion of the copolyesters may contain 20-50 mole percent 1,4-cyclohexanedimethanol, but the preferred amount is 30-40 mole percent. The 1,4-cyclohexanedimethanol may be the cis or trans isomer, but the commercially available 30/70 cis/trans isomer ratio is preferred. The inherent viscosity of the copolyesters is at least 0.4 and preferably at least 0.65.

The acid portion of the bisphenol A polyesters used in this invention may contain 20-80 mole percent terephthalic acid and 80-20 mole percent isophthalic acid. These polyesters are prepared by conventional techniques such as by acidolysis of bisphenol A diacetate with terephthalic and isophthalic acids. The preferred polyester contains 50 to 70 mole percent terephthalic acid. The inherent viscosity of the bisphenol A polyester is at least 0.55 and preferably at least 0.60.

The plastic compositions of the invention are made by conventional melt techniques. A particularly convenient method is by mixing the polyester powder or pellets in a melt extruder and extruding into a rod which can be cut into pellets. The two polyesters also may be physically mixed and then stirred in molten form in a flask or a reactor.

The preferred amount of the glycol copolyester is 30-40 weight percent, with about 40 weight percent being most preferred. The compositions containing 30-40 weight percent of the glycol copolyester are clear whereas those with 20 and 50 weight percent are slightly hazy. Since all these compositions have a single glass transition temperature, they have a high degree of compatibility. According to gel permeation chromatography, equilibration does rapidly occur between the two polyesters during the melt mixing process.

The compositions can be easily processed at temperatures of about 250°-300° C. even though the bisphenol polyesters alone are generally processed at about 350°-390° C. and the glycol polyesters are processed at about 240° C.

The inherent viscosity of the compositions of this invention is at least 0.4 and preferably at least 0.65 before processing into molded objects, films and the like.

Tough films are obtained by pressing or by extrusion. Molded plastic objects having high impact strength are obtained by injection molding at about 250°-300° C., depending on the level of glycol copolyester (20-50 weight percent). In addition to plastics, the compositions of this invention may be fabricated to give other types of shaped objects such as foamed plastics, fibers, films, extruded shapes and coatings. The compositions of this invention also may contain nucleating agents, synthetic fibers, pigments, glass fibers, asbestos fibers, antioxidants, plasticizers, lubricants and other additives.

This invention will be further illustrated by the following examples although it will be understood that these examples are included merely for purposes of illustration and are not intended to limit the scope of the invention.

EXAMPLES

All inherent viscosities are determined at 25° C. in a 40/35/25 weight mixture of p-chlorophenol/tetrachloroethane/phenol at a concentration of 0.1 g./100ml.

The compositions are dried in an oven at 100° C. overnight and injection molded to give 5×½×⅛-inch flexure bars for testing. ASTM procedures are used for measuring flexural modulus (ASTM D790) and notched Izod impact strength (ASTM D256 Method A).

This example illustrates the preparation of a composition from (1) 60 weight percent of a copolymer prepared from 65 mole percent terephthalic acid, 35 mole percent isophthalic acid, and bisphenol A diacetate; and (2) 40 weight percent of a copolymer prepared from poly(ethylene terephthalate) modified with 30 mole percent 1,4-cyclohexanedimethanol (30/70 cis/trans content).

A mixture of 210 grams (60 weight percent, I.V. 0.63, 3-mm. particles) of the above bisphenol A polyester is mechanically blended with 140 grams (40 weight percent, I.V. 0.72, 3-mm. particles) of the above glycol polyester. The physical blend is dried in a vacuum oven at 100° C. and then melt extruded at 300° C. in a screw-fed extruder from C. W. Brabender Instruments, Inc., South Hackensack, N.J. It has a single glass transition temperature at 126° C. The composition is dried in a vacuum oven at 100° C. overnight and injection molded at 265° C. with a Newbury reciprocating screw-fed one-ounce machine.

Table 1 shows some of the mechanical properties of this composition and, for comparison, the properties of the bisphenol A polyester alone, glycol polyester alone and compositions made from 80/20, 70/30 and 50/50 weight percent combinations of bisphenol A polyester/glycol polyester. The flexural moduli of the compositions of this invention are higher than that of the bisphenol A polyester or the glycol polyester from which the compositions are made, and the notched Izod impact strengths are high.

Table 2, for comparative purposes, shows similar compositions prepared with the same bisphenol polyester and poly(ethylene terephthalate). Only one of these compositions is clear and the impact strengths are appreciably lower than the compositions of this invention.

Table 3, also for comparative purposes, shows compositions prepared with the same bisphenol polyester and a glycol polyester of 1,4-cyclohexanedimethanol, 83 mole percent terephthalic acid and 17 mole percent isophthalic acid. Both the flexural moduli and the impact strengths are low. It is, therefore, very surprising that the glycol polyesters containing both ethylene glycol and 1,4-cyclohexanedimethanol are so effective in imparting both increased stiffness (modulus) and high notched Izod impact strengths to the compositions of this invention.

TABLE 1

| Composition | I.V. | Bar Clarity | Flexural Modulus, 10⁵ psi. | Notched Izod, Impact Strength, Ft.-Lb./In. |
| --- | --- | --- | --- | --- |
| Bisphenol A polyester[a] | 0.62 | — | 3.0 | 4.0 |
| Glycol polyester[b] | 0.68 | — | 2.7 | 0.9 |
| Bisphenol A/ glycol polyesters | | | | |
| 80/20 | 0.61 | Hazy | 3.1 | 3.0 |
| 70/30 | 0.65 | Clear | 3.3 | 4.4 |
| 60/40 | 0.63 | Clear | 3.3 | 2.8 |
| 50/50 | 0.63 | Slight haze | 3.3 | 2.0 |

[a]Polymer prepared from 65 mole percent terephthalic acid, 35 mole percent isophthalic acid and bisphenol A diacetate
[b]Poly(ethylene terephthalate) modified with 30 mole percent 1,4-cyclohexanedimethanol

TABLE 2

| Composition | I.V. | Bar Clarity | Flexural Modulus, 10⁵ psi. | Notched Izod, Impact Strength, Ft.-Lb./In. |
| --- | --- | --- | --- | --- |
| Bisphenol A polyester[a] | 0.62 | — | 3.0 | 4.0 |
| PET[b] | 0.62 | — | 3.3 | 0.3 |
| Bisphenol A/ polyesters | | | | |
| 70/30 | 0.54 | Clear | 3.4 | 1.5 |
| 60/40 | 0.56 | Slight haze | 3.6 | 1.3 |
| 50/50 | 0.53 | Slight haze | 3.4 | 0.8 |

[a]Polymer prepared from 65 mole percent terephthalic acid, 35 mole percent isophthalic acid and bisphenol A diacetate
[b]Poly(ethylene terephthalate)

TABLE 3

| Composition | I.V. | Bar Clarity | Flexural Modulus, 10⁵ psi. | Notched Izod, Impact Strength, Ft.-Lb./In. |
| --- | --- | --- | --- | --- |
| Bisphenol A polyester[a] | 0.62 | — | 3.0 | 4.0 |
| Kodar A150[b] | 0.75 | — | 2.6 | 1.0 |
| Bisphenol A/ Kodar polyesters | | | | |
| 80/20 | 0.56 | Hazy | 2.9 | 1.6 |
| 70/30 | 0.61 | Clear | 2.8 | 1.5 |
| 50/50 | 0.67 | Hazy | 2.8 | 1.5 |

[a]Polymer prepared from 65 mole percent terephthalic acid, 35 mole percent isophthalic acid and bisphenol A diacetate
[b]Polymer prepared from 83 mole percent terephthalic acid, 17 mole percent isophthalic acid and 1,4-cyclohexanedimethanol This invention has been described in detail with particular reference to preferred embodiments thereof, but it will be understood that variations and modifications can be effected within the spirit and scope of the invention.

We claim:

1. Copolyesters prepared from 50 to 80 weight percent of an aromatic polyester derived from 20-80 mole percent terephthalic acid, 80-20 mole percent isophthalic acid and 4,4'-isopropylidenediphenol; and 50-20 weight percent of a glycol polyester derived from terephthalic acid, 50-80 mole percent ethylene glycol, and 50-20 mole percent 1,4-cyclohexanedimethanol.

2. Composition of claim 1 wherein the glycol copolyester is present in the amount of about 30 to 40 weight percent.

3. Shaped object of the composition of claim 1.

* * * * *